(12) United States Patent
Krycki et al.

(10) Patent No.: US 8,282,374 B2
(45) Date of Patent: Oct. 9, 2012

(54) EVACUATION SYSTEM FOR PLASTICS EXTRUSION

(75) Inventors: Robert D. Krycki, Brampton (CA); Mohammed El-Haddawi, Mississauga (CA)

(73) Assignee: Future Design Inc., Mississauga (CA)

( * ) Notice: Subject to any disclaimer, the term of this patent is extended or adjusted under 35 U.S.C. 154(b) by 376 days.

(21) Appl. No.: 12/557,103

(22) Filed: Sep. 10, 2009

(65) Prior Publication Data

US 2010/0086632 A1 Apr. 8, 2010

Related U.S. Application Data

(60) Provisional application No. 61/102,985, filed on Oct. 6, 2008.

(51) Int. Cl.
*B29C 47/20* (2006.01)

(52) U.S. Cl. ......... 425/72.1; 425/66; 425/380; 425/461; 425/467

(58) Field of Classification Search .................... 425/66, 425/72.1, 380, 461, 467
See application file for complete search history.

(56) References Cited

U.S. PATENT DOCUMENTS

| | | | | |
|---|---|---|---|---|
| 3,888,609 A | * | 6/1975 | Saint Eve et al. | 425/72.1 |
| 4,473,527 A | * | 9/1984 | Fujisaki et al. | 264/566 |
| 4,750,874 A | | 6/1988 | Keim | |
| 2002/0018822 A1 | * | 2/2002 | Krycki | 425/72.1 |
| 2005/0285315 A1 | | 12/2005 | Fahling et al. | |

FOREIGN PATENT DOCUMENTS

| | | |
|---|---|---|
| CA | 2315463 A1 | 9/2002 |
| EP | 0950499 A1 | 10/1999 |

* cited by examiner

*Primary Examiner* — Yogendra Gupta
*Assistant Examiner* — Joseph Leyson
(74) *Attorney, Agent, or Firm* — Evans & Dixon, LLC; Joseph M. Rolnicki (57) ABSTRACT

Disclosed is an evacuation system for use with plastic extrusion dies, in particular a contaminant evacuation system for removal of air borne contaminants generated at the die orifice of a plastics extrusion apparatus. The system includes an annular evacuation chamber and a suction source connected to the evacuation chamber for generating a vacuum in the evacuation chamber. The evacuation chamber has a radially inwardly directed annular air intake opening for placement about the die orifice, and a baffle structure in the evacuation chamber for equalizing suction pressure along the air intake opening and reduce or avoid localized pressure differences around the extruded product, which would lead to deformation of the product.

15 Claims, 7 Drawing Sheets

EVACUATION SYSTEM FOR PLASTICS EXTRUSION

CROSS REFERENCE TO RELATED APPLICATIONS

This application claims the benefit of priority of U.S. Provisional Patent Application No. 61/102,985 filed Oct. 6, 2008, the contents of which is incorporated herein by reference.

FIELD OF THE INVENTION

The present invention relates to the plastics industry and in particular to apparatus for plastics extrusion. More particularly, it relates to evacuation systems for use with plastic extrusion dies.

BACKGROUND OF THE INVENTION

Plastic extrusion processes usually produce different contaminants like smoke, solid particles, vapours and plate off. Those contaminants are a major factor in polluting the production environment. Some of them are a direct health hazard while others will pollute the product and affect the quality and composition of the final product. Thus, periodic cleaning of the sensitive equipment employed in plastics extrusion processes is required to maintain a clean production environment.

Usually such cleaning tasks are performed manually and must be repeated according the production volume and the sensitivity of the product and the production equipment. This requires periodic production shut-down, which is economically undesirable.

Ventilation of the production area is one of the methods used to reduce the pollution impact. However, ventilation and the resulting quick air drafts have inherent problems that may effect the production process so that ventilation by no means is an effective solution to air borne contaminants. The effectiveness of the ventilation is also dependent from vent location and even weather factors. Moreover, ventilation is an expensive pollution control method, since large amounts of air need to be replaced and conditioned to comfort level for the operators and the correct ambient temperature for the production process. Thus, a more effective and efficient pollution control process is desired.

Plastics are generally extended into solid parts or film. Plastics films are usually blown. All blown film is extruded either vertically, up or down, or horizontally. In all instances, as the melted polymeric material exits the cylindrical die as a tube, air is passed through the die into the tube to inflate the tube to form a tubular bubble, the passage of air being controlled to provide the bubble with a desired diameter. In addition, as the tube leaves the die, it is cooled by air blown from an annular nozzle or nozzles provided in an air cooling ring, a so called "air-ring". An internal bubble cooling system may also be present by which air is continuously exchanged inside the bubble to cool the bubble from the inside.

The ring is connected to an air plenum chamber which supplies large quantities of air to the outside of the bubble so that the film material becomes firm before it is passed between two rollers (usually known as "nip rollers") of a tube collapsing system downstream from the die. A typical prior art air ring is shown, for example, in U.S. Pat. No. 4,750,874, issued Jun. 14, 1998 to Keim.

During the film blowing process, the blow up ratio and rate of change in film thickness of the tubular bubble are at least partly dependent upon the flow rate of cooling air directed onto the tubular bubble immediately after it leaves the die orifice. To adjust these parameters one can adjust the flow rate of cooling air through an annular nozzle which lies closely adjacent to the die orifice. Adjustment of the cooling air flow rate is known to be a fine tuning operation to produce a required blow up ratio and film thickness suitable for a particular polymer. It is also known that the cooling air film must be as equal and evenly distributed as possible along the circumference of the bubble in order to avoid localized distortion or thickness variations in the film.

Molten polymeric material, upon issue from an extrusion die orifice, is accompanied by undesirable contaminants, such as smoke, odorous fumes and other airborne contaminants resulting from the extrusion process. Processing aids for the improved processing of the materials extruded also contribute to contamination of the working environment. Processing aids generally are no longer useful after they are heated and exit the die. All of these contaminants serve to increase pollution of the atmosphere immediately within the working environment adjacent to the extrusion apparatus and progressively pass into and pollute the surrounding atmosphere within a factory. Hence, such contaminants present an uncomfortable and possibly unhealthy atmosphere in which to work and may lead to pollution of the product. It would be desirous, therefore, if some means were to be found for at least reducing contaminant infiltration into the atmosphere.

U.S. 2005 0285315 (published Dec. 29, 2005) describes a blown film manufacturing process wherein the cooling air used to cool the exterior of the bubble is drawn off by way of a suction ring immediately upstream of the nip rollers.

EP 0950499 (published Oct. 20, 1999) discloses a method for manufacturing a blown film, wherein a laminar air flow screen, in addition to the cooling air flow generated by the air ring, is used to prevent dust particles from coming into contact with the film bubble.

Canadian Patent Application 2,315,463 discloses a system for evacuating contaminants in a conventional air ring setup. However, this application discloses a vacuum system placed directly against the air ring and at the extrusion nozzle. It is even suggested that the evacuation system inlet be placed adjacent to or replace the primary air outlet of the air ring. It has now been discovered that this placement of the evacuation system intake is disadvantageous. Interference with the air flow for the air ring may significantly impact the performance of the air ring and may lead to unpredictable variations in the fluidness and of the extruded film and deformation of the extruded film bubble.

SUMMARY OF THE INVENTION

The present invention seeks to provide apparatus which is an improvement upon conventional constructions and addresses at least one of the problems in the prior art apparatus discussed above.

It is now an aspect of the invention to provide an evacuation system for plastics extrusion processes for removal of contaminants at the source of contaminant production, the extrusion die.

The inventors of the present application have now surprisingly discovered that the placement of the air intake of an air evacuation unit axially adjacent the extrusion nozzle and axially spaced from any downstream cooling air outlets is important for reducing unwanted interference with the cooling air flow.

It has further been discovered that even when the evacuation system is axially spaced from any downstream cooling air outlets, the system must include means for equalizing the suction pressure and intake air flow along the intake opening in order to avoid localized pressure differences around the extruded product.

Accordingly, the invention provides a contaminant evacuation system for a plastics product extrusion process, comprising an annular evacuation chamber;

a suction source connected to the evacuation chamber for generating a vacuum in the evacuation chamber, the evacuation chamber having a radially inwardly directed annular air intake opening, and means in the evacuation chamber for equalizing suction pressure along the air intake opening.

The invention also provides, according to another aspect, an apparatus for extruding a tubular bubble of plastic comprising:

a plastics extruder having a die orifice with a die axis;

an air ring for supplying cooling air to an exterior surface of the tubular bubble of plastic after its extrusion from the die orifice, and having an annular cooling air outlet; and a contaminant evacuation system comprising:

an annular evacuation chamber, a suction source connected to the evacuation chamber for generating a vacuum in the evacuation chamber, the evacuating chamber having a radially inwardly directed annular air intake opening, and means in the evacuation chamber for equalizing suction pressure along the air intake opening, wherein the air intake opening is disposed axially between the die orifice and the annular cooling air outlet means so as to face towards an exterior of the tubular bubble as it is being formed, the intake opening being axially spaced from the air ring and positioned adjacent the die orifice for preventing interference of the suction pressure generated at the air intake opening with a cooling air flow generated by the air ring.

A significant percentage of contaminants, such as smoke, odorous fumes and other airborne contaminants resulting from the extrusion process, are removed by this apparatus immediately at the die orifice, as the plastic material for the bubble emerges from the die orifice.

The evacuation chamber is preferably disk shaped and includes at least one air flow control baffle for equalizing the suction pressure along the air intake opening.

BRIEF DESCRIPTION OF THE DRAWINGS

Embodiments of the invention will now be described, by way of example, with reference to the accompanying drawings in which.

DETAILED DESCRIPTION OF PREFERRED EMBODIMENTS

Before explaining the present invention in detail, it is to be understood that the invention is not limited to the preferred embodiments contained herein. The invention is capable of other embodiments and of being practiced or carried out in a variety of ways. It is to be understood that the phraseology and terminology employed herein are for the purpose of description and not of limitation.

The invention is directed to plastics extrusion process and apparatus and in particular to contaminant evacuation systems for use therewith.

While the invention has been described with a certain degree of particularity, it is understood that the invention is not limited to the embodiments set forth herein for purposes of exemplification, but is to be limited only by the scope of the attached claims, including the full range of equivalency to which each element thereof is entitled.

Although the present invention has been explained hereinabove by way of preferred embodiments thereof, it should be pointed out that any modifications to these preferred embodiments within the scope of the appended claims are not deemed to alter or change the nature and scope of the present invention.

Figure 1:
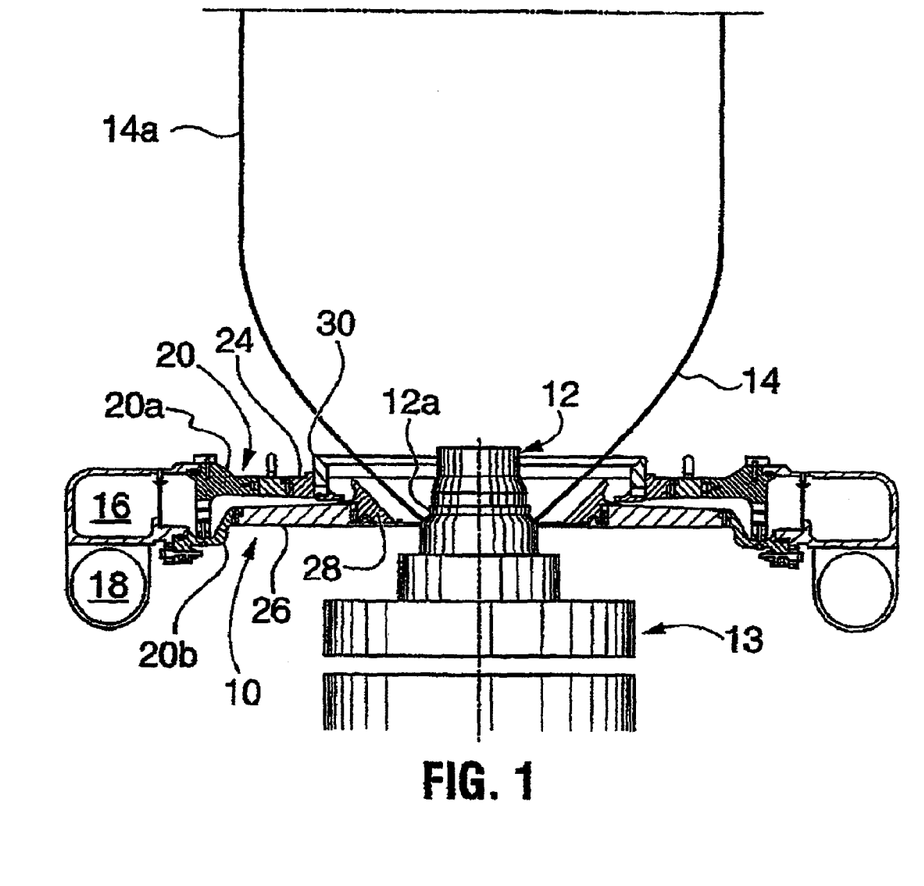
FIG. 1 is a sectional elevation through a conventional blown film extrusion apparatus.

FIG. 1 shows a conventional blown film extrusion arrangement including an air ring, generally indicated as item 10, surrounding an extrusion die 12 mounted on top of a plastics extruder indicated at 13 and having a die aperture in an annular nozzle 12a on the extruder die. The nozzle produces a thin-walled cone of plastic 14, i.e. polymeric material, which is expanded to form an expanding tubular bubble 14a by air injected into the tube through the centre of the nozzle 12a, while the bubble is drawn upwards by nip rollers (not shown). The nozzle, central air supply and cooling ring are all of known form and do not constitute part of the invention.

The air ring 10 is surrounded by an air plenum chamber 16 supplied with air through inlet ducts 18. An annular connecting member 20 has seals 21, 22, connecting it to upper and lower walls of the plenum chamber. The member 20 has upper and lower flanges 20a and 20b by which it is connected respectively to an outer lip holder 24, and an inner lip part 26. Passages 23 through the connecting member allow air to pass from the chamber 16 to the space between the flanges 20a and 20b. The inner lip part 26 has a thin, radially inwardly extending inner lip 26a, which is spaced from the die 12 and situated just upstream of (just below) the die outlet nozzle 12a. The part 26 also supports, via a screw connection 27, and intermediate lip 28, the lower edge of which is closely adjacent the inner lip 26a, to define therewith a narrow primary air outlet 29 which directs air generally inwards on to the die at or just below the nozzle 12a.

In operation, air is supplied to the plenum chamber 16 while plastic is extruded from the nozzle 12a. The plastic leaves the nozzle as a cone and air issuing from the primary and secondary air outlets 29 and 32 both cools the plastic and ensures that it does not contact any of the lips. The plastic is drawn away from the nozzle 12a by nip rollers (not shown). The construction and function of the air ring is known and does not form part of the present invention.

Figure 2:
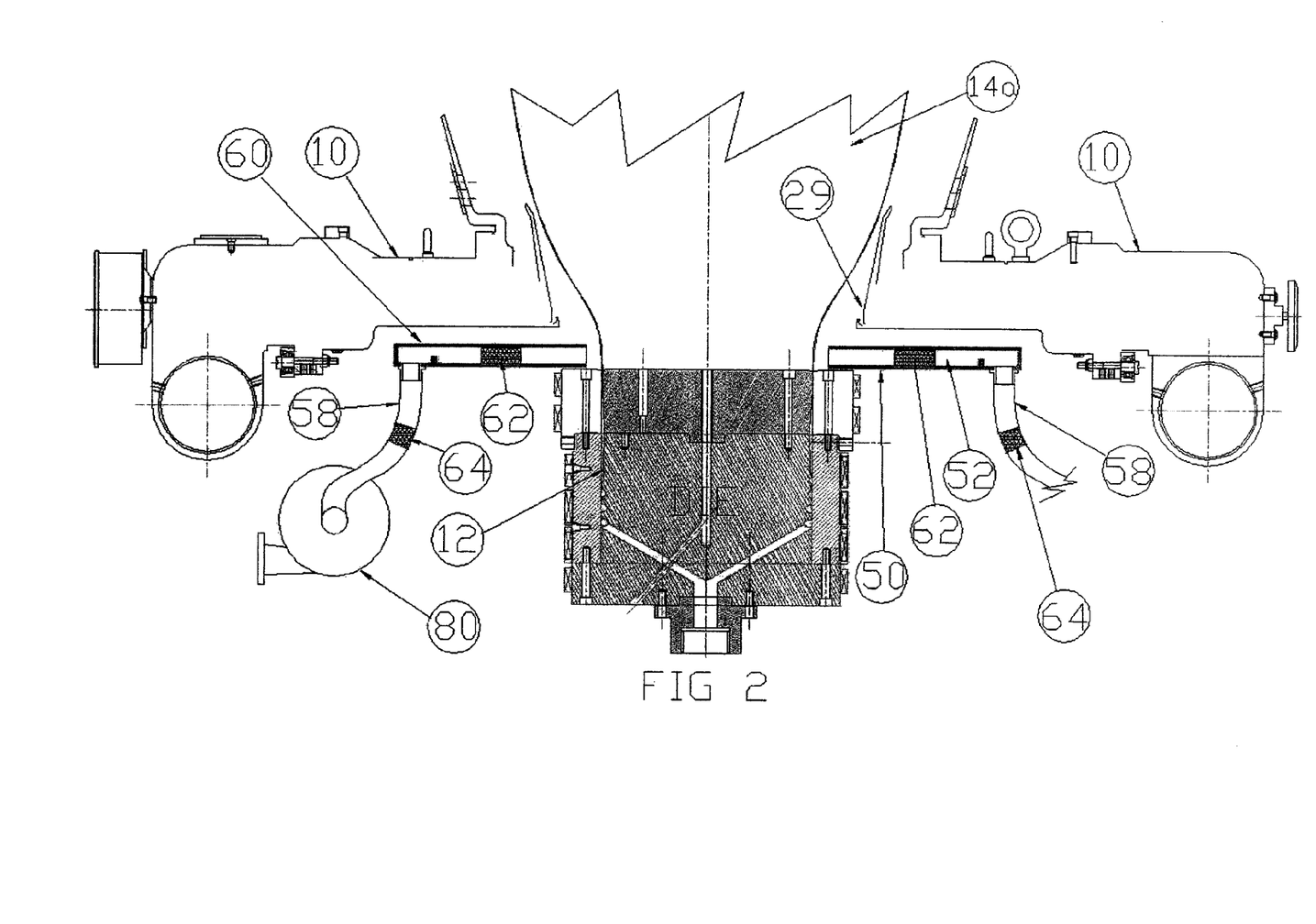
FIG. 2 is a sectional elevation through a blown film extrusion apparatus including an evacuation system in accordance with the invention.

In a preferred embodiment in accordance with the invention, as shown in FIG. 2, an apparatus for the extrusion of plastic film is provided with a contaminant evacuation system 50. The evacuation system includes an annular evacuation chamber 52 surrounding the central axis of the die 12, the chamber being defined by a pair of parallel annual plates 54 (see FIG. 3). The plates 54 are spaced apart and at their radially inward edge define an air intake orifice 56 connected to the annular evacuation chamber 52. The annular orifice 56 in the installed condition of the evacuation system 50 as illustrated in FIG. 2 faces towards the path of the polymeric material bubble 14a immediately as it issues from the extrusion die 12. The annular orifice 56, therefore, is positioned axially between the die 12 and the primary air outlet 29 of the air ring 10. The annular orifice 56 is an air intake opening for removing contaminants, such as smoke, odorous fumes, and other airborne contaminants exiting the extrusion orifice as a result of the extrusion process.

The evacuation system 50 further includes a suction source in the form of a blower 80 and the annular orifice 56 is connected to the suction source by way of the evacuation chamber 52 and vacuum hoses 58. Filters (not shown) are preferably provided as necessary throughout the evacuation system. In the preferred embodiment, a filter 60 is provided, for instance, in the form of an annular filter 62 within the chamber 52. The annular evacuation chamber 50 can be opened in the preferred embodiment for replacement of the filter. For example, the top annular plate 54*a* may be detachably affixed to the bottom plate 54*b*. Further filters 64 can be placed downstream of the evacuation chamber 52 and upstream of the blower 80. The type and placement of any filters used will depend on the desired contaminant to be retained and the air flow requirements of the system.

The filters preferably operate to extract contaminants which may be harmful to personnel or dangerous when accumulated on machinery or building surfaces that may become slippery or oily from the oil and air-borne by products. The air which has been cleared by the filters may then be discharged back into the surrounding air within the factory if desired.

Evacuated air may also be cleaned by using an electrostatic precipitator.

It is preferred that the inlet orifice 56 be positioned closely adjacent to the die orifice for removal of the contaminants directly at their source and before they are disbursed into the surrounding air by the strong air currents generated by the air ring 10.

Removal of the contaminants results in a healthier working environment and assists in retarding the accumulation of undesirable debris and contaminant surface coatings upon factory structures and machines.

It has now been found in extensive experimentation that in order to avoid distribution of the contaminants, the evacuation system 50 must provide for a minimum suction flow of 1 cubic foot per minute per inch of die circumference. It has also been surprisingly found that increasing the suction flow above 50 cubic feet per minute per inch of die circumference will generate interference with the extrusion process, especially the cooling air flow generated by the air ring. This interference has been observed even when the air intake orifice 56 is placed axially immediately adjacent the die orifice and at a distance of 12 inches or more upstream of the air ring.

Testing of an evacuation system with a hollow annular evacuation chamber 52 and an annular air intake orifice 56 also showed that reliable contaminant removal cannot be achieved and interference of the generated suction flow with the extrusion process cannot be reliably prevented, unless the evacuation chamber 52 includes means, such as air flow controlling structures, for equalizing the suction pressure along the air intake orifice.

Figure 3:
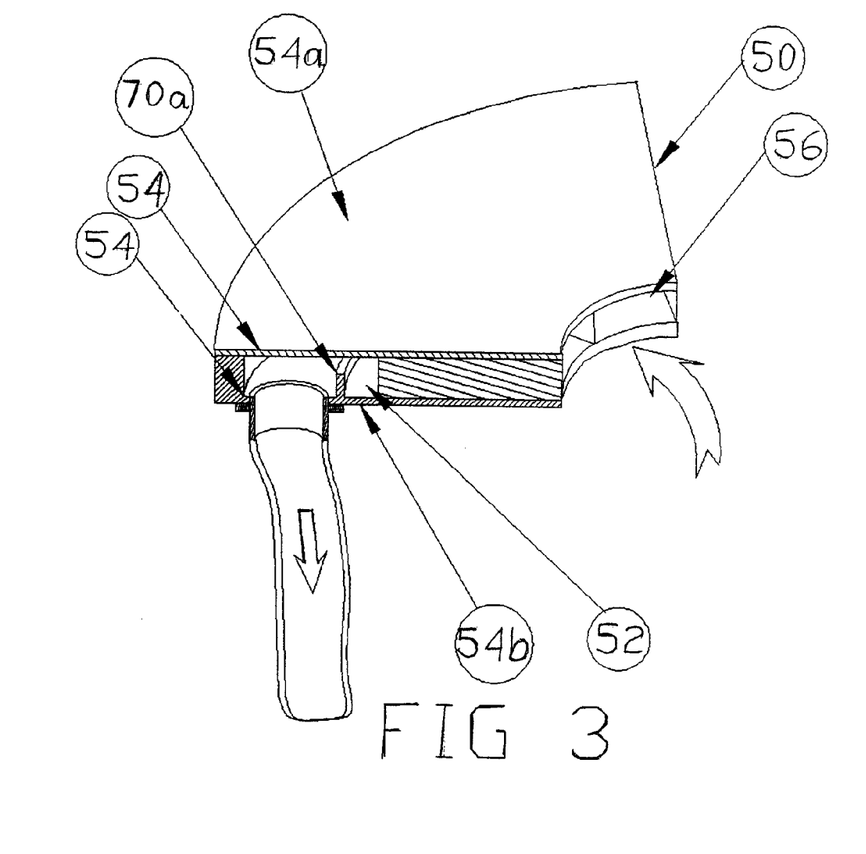
FIGS. 3 and 4 are sectional views of the apparatus of FIG. 2 showing details of the evacuation system.
Figure 5:
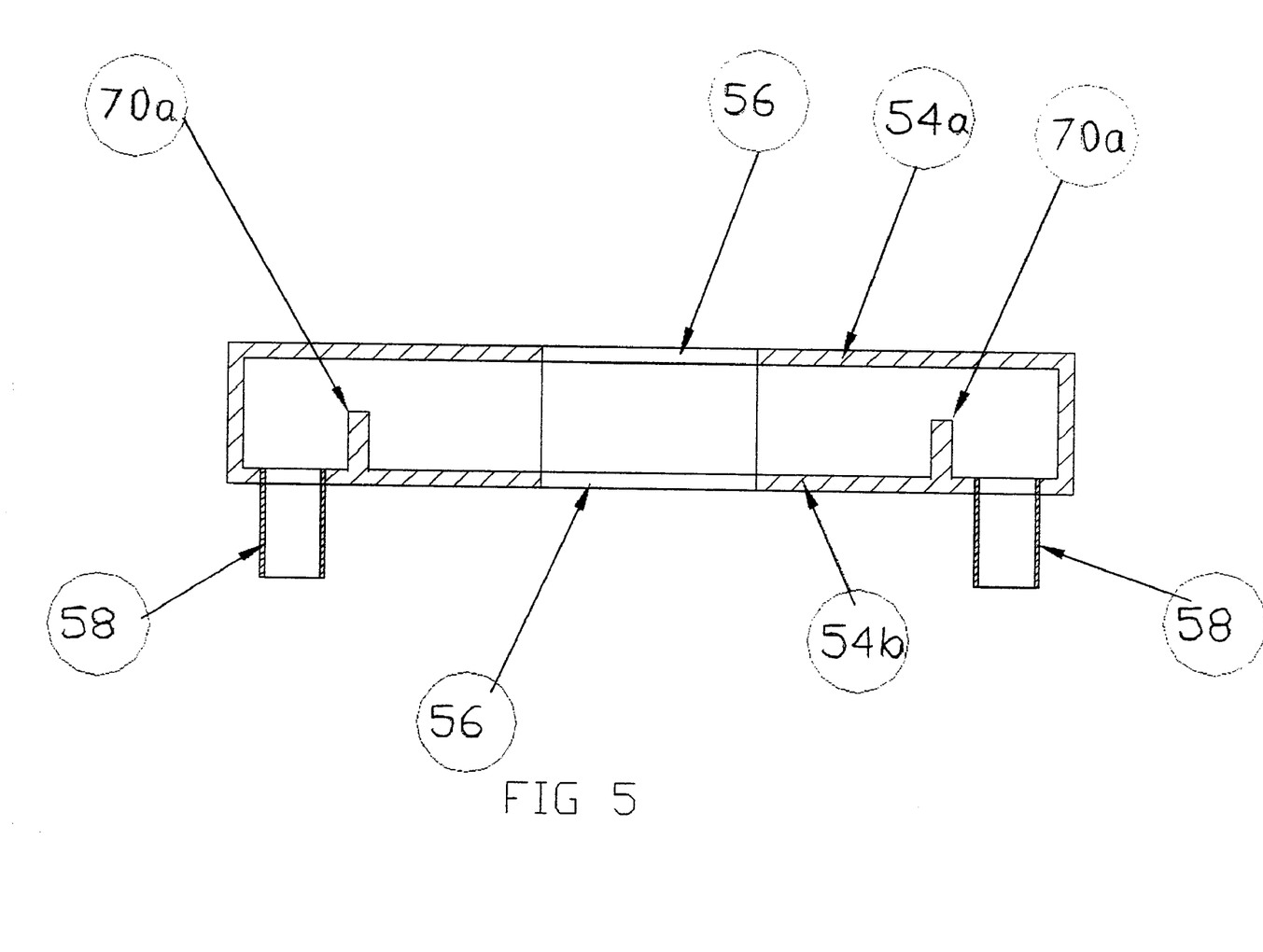
FIG. 5 is an enlarged view of a portion of FIG. 2 to show the evacuation chamber construction in cross-section.
Figure 6:
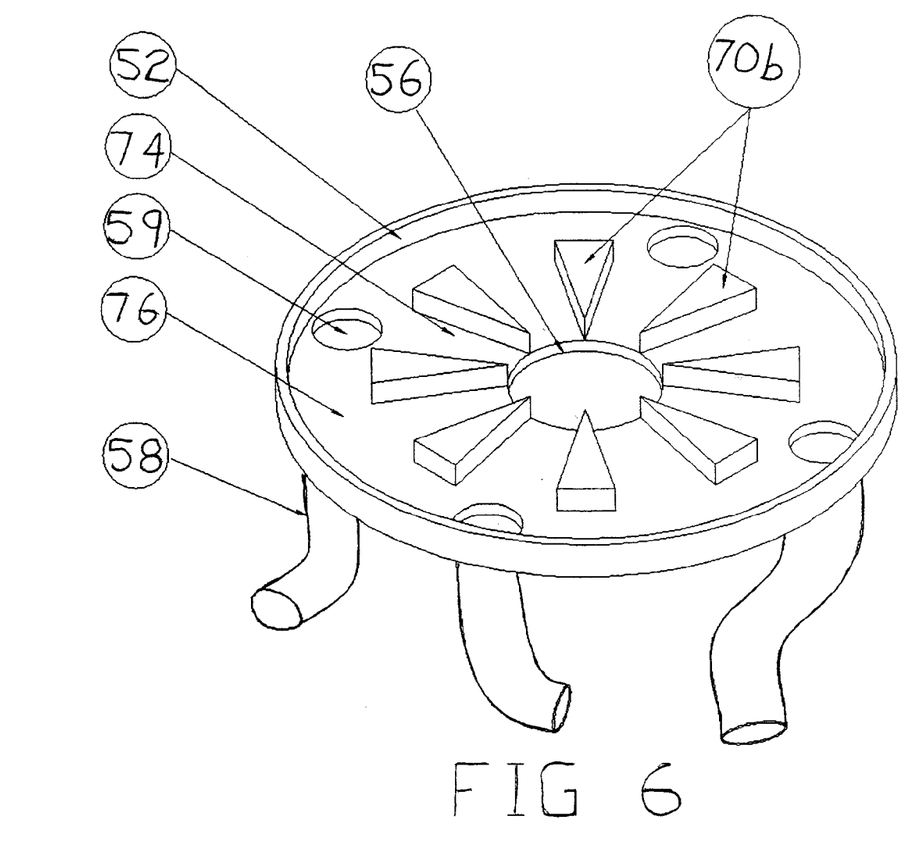
FIG. 6 is a partial cut-away view of the evacuation chamber showing the chamber with the top plate removed and illustrating the air flow control structures provided in the chamber to equalize suction pressure.

Preferably, the evacuation chamber 52, as illustrated in FIGS. 3, 5 and 6, includes one or more air baffles 70. In the embodiment shown in FIGS. 3 and 5, the evacuation chamber 52 includes an air baffle 70*a* for each suction hose inlet 59, which baffle ensures an even suction pressure distribution and air flow at least in the vicinity of the suction hose inlets. In the most preferred embodiment as illustrated in FIG. 6, the evacuation chamber 52 includes multiple radial baffles 70*b* which ensure an even distribution of the suction air flow and pressure along the intake orifice 56. The radial baffles 70*b* are preferably wedge shaped to define radial suction channels 74 of constant cross-section in the evacuation chamber 52. The radial suction channels 74 radially inwardly connect to the air intake orifice 56 and radially outwardly communicate with an annular air channel 76 which includes the suction hose inlets 59. This prevents localized air flow and air speed differences which could result in pressure variations along the intake orifice 56. Other structures and means for controlling the air flow distribution in the evacuation chamber, such as valves or gates, can also be used to ensure an even suction pressure distribution at the intake orifice 56.

Figure 4:
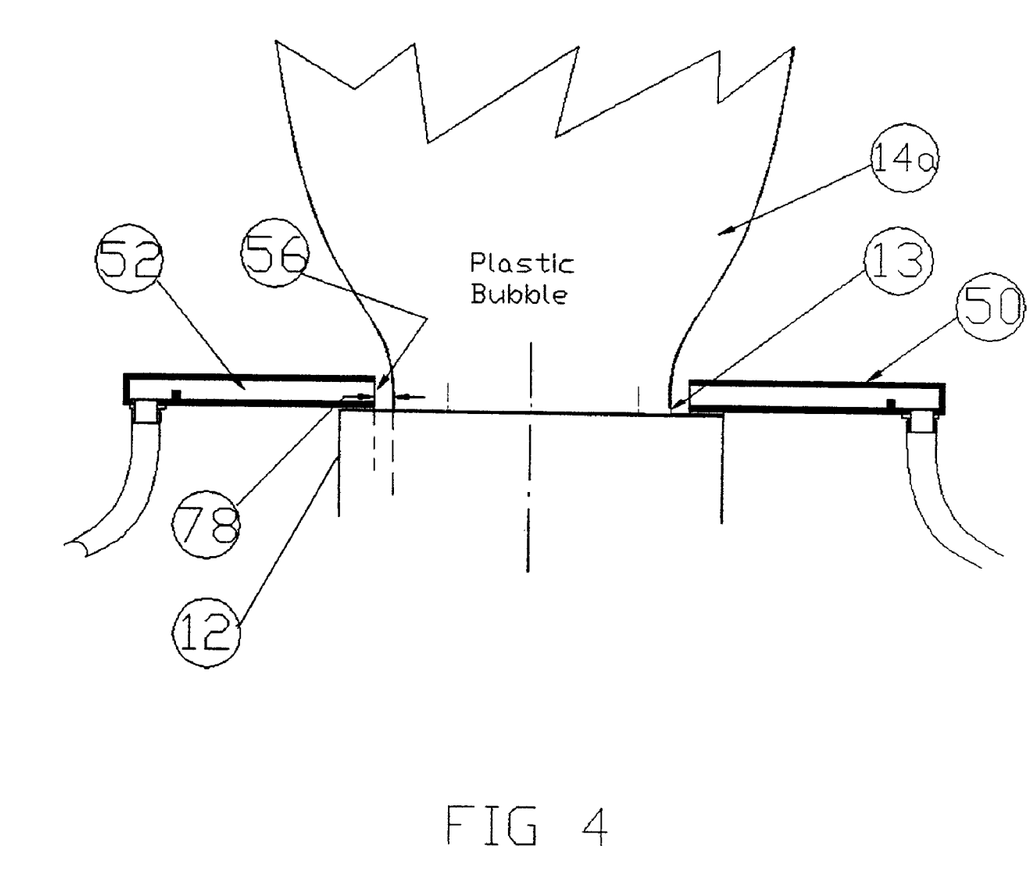
Figure 7:
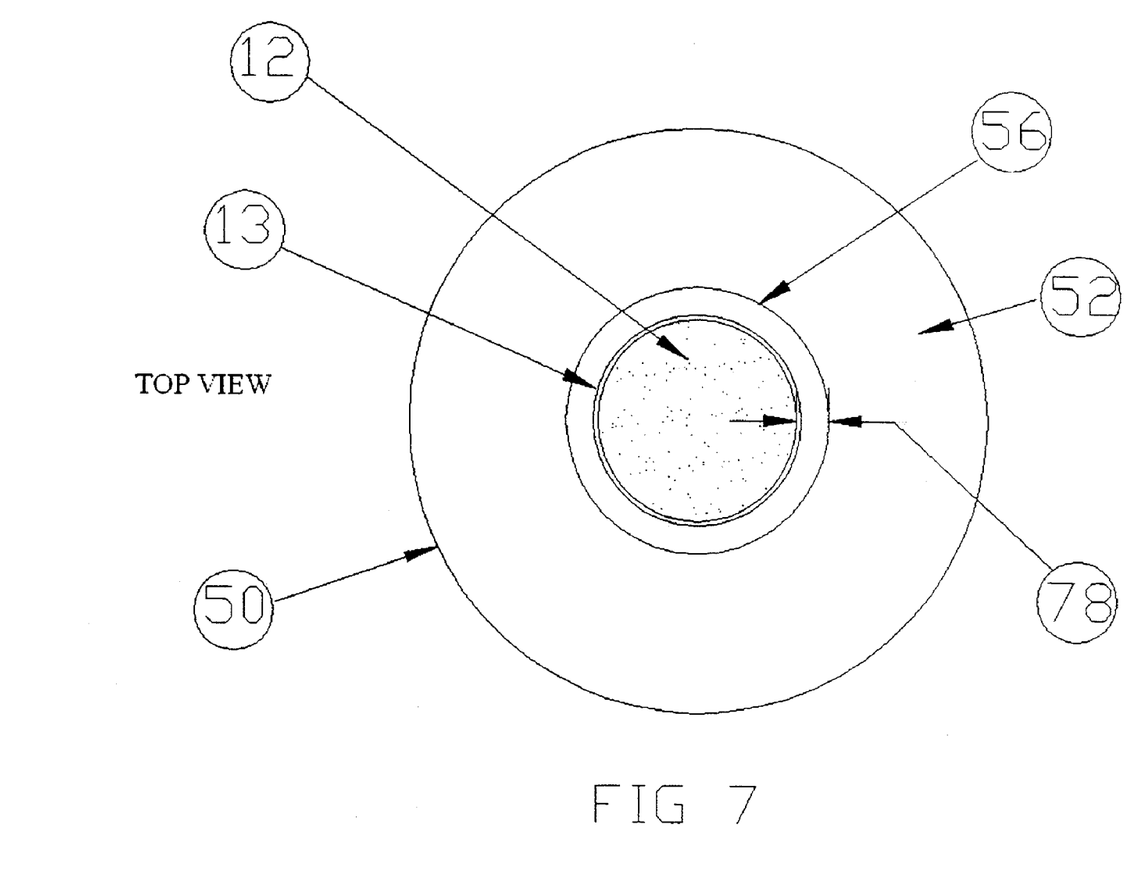
FIG. 7 illustrates the co-axial placement of the extrusion die and the evacuation chamber.

In the preferred embodiment as shown in FIGS. 4 and 7, the annular orifice 56 is placed immediately adjacent to and downstream of the die orifice 13 and coaxial therewith (see FIG. 7). In order to ensure reliable contaminant removal, while preventing interference with the extrusion process, the annular intake orifice 56 must be located at a radial spacing 78 from the die orifice. The intake orifice 56 must be spaced in radial direction a maximum of 3 inches and a minimum of 1 inch from the die orifice. It is preferred that the intake orifice 56 and the die orifice are coaxially arranged as shown in FIG. 7.

Although the present invention has been explained hereinabove by way of preferred embodiments thereof, it should be pointed out that any modifications to these preferred embodiments within the scope of the appended claims are not deemed to alter or change the nature and scope of the present invention.

The invention claimed is:

1. A plastic extrusion apparatus comprising:
   an extrusion die having a center axis and an orifice that is operable to produce a tube of plastic extruded from the extrusion die;
   an air ring that is coaxial with the extrusion die center axis, the air ring having an air outlet that is operable to direct air inwardly to cool plastic extruded from the extrusion die;
   a hollow, annular evacuation chamber surrounding the extrusion die, the annular evacuation chamber being defined by a pair of parallel annular plates, the annular plates being axially spaced and having radially inward edges that define an annular air intake orifice of the annular evacuation chamber, the annular air intake orifice facing toward the die orifice and being adjacent and radially spaced from the die orifice;
   a plurality of suction inlets in at least one of the annular plates of the pair of annular plates; and,
   a plurality of air baffles in the annular evacuation chamber on the at least one annular plate, the plurality of air baffles including an air baffle for each suction inlet whereby each air baffle ensures an even suction pressure distribution and airflow at least in a vicinity of the suction inlet.

2. The apparatus of claim 1, further comprising:
   each air baffle for each suction inlet being formed as an arc that arcs around the suction inlet between the suction inlet and the annular air intake orifice of the annular evacuation chamber.

3. The apparatus of claim 1, further comprising:
   the annular evacuation chamber having an annular air channel inside the annular evacuation chamber; and
   the annular air channel includes the plurality of suction inlets.

4. The apparatus of claim 1, further comprising:
   the annular air intake orifice of the annular evacuation chamber being positioned axially between the extrusion die and the air ring.

5. The apparatus of claim 1, further comprising:
the annular air intake orifice being positioned adjacent to and downstream of the extrusion die orifice.

6. The apparatus of claim 1, further comprising:
the annular air intake orifice being positioned axially between the extrusion die orifice and the air ring air outlet.

7. The apparatus of claim 1, further comprising:
a suction source communicating with the annular evacuation chamber, the annular air intake orifice communicating with the suction source by way of the annular evacuation chamber, the suction source being operable to create a vacuum pressure in the annular evacuation chamber and at the annular air intake orifice.

8. A plastic extrusion apparatus comprising:
an extrusion die having a center axis and an orifice that is operable to produce a tube of plastic extruded from the extrusion die;
an air ring that is coaxial with the extrusion die center axis, the air ring having an air outlet that is operable to direct air inwardly to cool plastic extruded from the extrusion die;
a hollow, annular evacuation chamber surrounding the extrusion die, the annular evacuation chamber being defined by a pair of parallel annular plates, the annular plates being axially spaced and having radially inward edges that define an annular air intake orifice of the annular evacuation chamber, the annular air intake orifice facing toward the die orifice and being adjacent and radially spaced from the die orifice;
a plurality of suction inlets in at least one of the annular plates of the pair of annular plates; and,
the annular evacuation chamber including an annular air channel and a plurality of radial air baffle in the annular evacuation chamber, the plurality of air baffles extending radially between the annular air intake orifice and the annular air channel and defining radial suction channels of constant cross-section in the annular evacuation chamber.

9. The apparatus of claim 8, further comprising:
the radial suction channels extending radially inwardly to the annular air intake orifice and extending radially outwardly to the annular air channel.

10. The apparatus of claim 9, further comprising:
the annular air channel includes the plurality of suction inlets.

11. The apparatus of claim 8, further comprising:
each radial air baffle of the plurality of radial air baffles is wedge shaped to define the radial suction channels with the constant cross-section between adjacent radial air baffles of the plurality of radial air baffles in the annular evacuation chamber.

12. The apparatus of claim 8, further comprising:
the annular air intake orifice of the annular evacuation chamber being positioned axially between the extrusion die and the air ring.

13. The apparatus of claim 8 further comprising:
the annular air intake orifice being positioned adjacent to and downstream of the extrusion die orifice.

14. The apparatus of claim 8, further comprising:
the annular air intake orifice being positioned axially between the extrusion die orifice and the air ring air outlet.

15. The apparatus of claim 8, further comprising:
a suction source communicating with the annular evacuation chamber, the annular air intake orifice communicating with the suction source by way of the annular evacuation chamber, the suction source being operable to create a vacuum pressure in the annular evacuation chamber and at the annular air intake orifice.

* * * * *